United States Patent [19]

Nash et al.

[11] Patent Number: 4,512,013

[45] Date of Patent: Apr. 16, 1985

[54] SIMULTANEOUS TRANSMISSION OF SPEECH AND DATA OVER AN ANALOG CHANNEL

[75] Inventors: Randy D. Nash, Ocean; Wai C. Wong, Aberdeen, both of N.J.

[73] Assignee: AT&T Bell Laboratories, Murray Hill, N.J.

[21] Appl. No.: 483,879

[22] Filed: Apr. 11, 1983

[51] Int. Cl.$^3$ .............................................. H04J 1/02
[52] U.S. Cl. ................................... 370/69.1; 370/118
[58] Field of Search ............... 370/69.1, 76, 119, 118, 370/19; 381/1, 3

[56] References Cited

U.S. PATENT DOCUMENTS

| | | | |
|---|---|---|---|
| 3,718,767 | 2/1973 | Ellis | 370/76 |
| 3,824,347 | 7/1974 | Sorber et al. | 370/76 |
| 3,875,339 | 4/1975 | Gruen et al. | 370/76 |
| 4,238,849 | 12/1980 | Gassmann | 370/76 |
| 4,280,020 | 7/1981 | Schnurr | 179/2 EA |
| 4,313,197 | 1/1982 | Maxemchuk | 370/111 |
| 4,346,380 | 8/1982 | Monticelli et al. | 340/825.63 |
| 4,355,401 | 10/1982 | Ikoma et al. | 375/5 |
| 4,379,947 | 4/1983 | Warner | 370/76 |

OTHER PUBLICATIONS

"Adaptive Noise Cancelling: Principles and Applications", by Widrow et al., Proceeding IEEE, vol. 63, No. 12, Dec. 1975, pp. 1692-1716.
"Speech and Data Transmission in ACS Telephone Channels", by Bukhviner, Telecomm. & Radio Eng., vol. 30/31; Jul. 1976, pp. 111-113.
"A New Generation of Speech Plus Data Multiplexer", by Shum et al., Conf. on Communications and Equipment and Systems, Birmingham, England, Apr. 4-7, 1978, pp. 111-113.
"Frequency Domain Data Transmission Using Reduced Computational Complexity Algorithms", by Peled et al., ICASSP 80 Proc., Denver, Colo., vol. 1, Apr. 9-11, 1980, pp. 964-967.
"An Integrated Digital Subscribers Speech & Data Service", by L. J. Stagg et al., ICC '80 Conf. Rec., vol. 3, Seattle, Wash.; Jun. 8-12, 1980; pp. 39.6.1-39.6.6.
"Speech-Band Data Modems", by Adams; Electronics & Power, vol. 26, No. 9; Sep. 1980; pp. 733-736.
"Adaptive Equalization and Phase Tracking for Simultaneous Analog/Digital Data Transmission", by Lim et al., BSTJ, vol. 60, No. 9, pp. 2039-2063.
"Simultaneous Transmission of Speech and Data Using Code-Breaking Techniques", by Steele et al.; BSTJ, vol. 60, No. 9; Nov. 1981, pp. 2081-2105.
"Method for Superimposing Data on Amplitude-Modulated Signals", by Lockhart et al.; Electronics Letters, vol. 18, No. 9, Apr. 29, 1982; pp. 379-381.
"High-Speed Digital and Analog Parallel Transmission Technique Over a Single Telephone Channel", by Akashi et al., IEEE Trans. on Communications; vol. COM-30, No. 5, May 1982, pp. 1213-1218.

Primary Examiner—Douglas W. Olms
Attorney, Agent, or Firm—Erwin W. Pfeifle

[57] ABSTRACT

The present invention relates to a technique for transmitting an entire analog speech signal and a modulated data signal over a transmission channel such as a common analog telephone speech channel. The present technique multiplexes the entire modulated data signal within the normal analog speech signal frequency band where the speech is present and its signal power density characteristic is at a low level. Separation of the speech and data signals at the receiver is effected by recovering the modulation carrier frequency and demodulating the received signal to recover the data signal. The data signal is then remodulated with the recovered carrier and is convolved with an arbitrary channel impulse response in an adaptive filter whose output signal is subtracted from the received composite data and speech signal to generate the recovered speech signal. To improve the recovered speech signal, a least mean square algorithm is used to update the arbitrary channel impulse response output signal of the adaptive filter.

5 Claims, 4 Drawing Figures

SIMULTANEOUS TRANSMISSION OF SPEECH AND DATA OVER AN ANALOG CHANNEL

BACKGROUND OF THE INVENTION

1. Field of the Invention

The present invention relates to a technique for the simultaneous transmission of speech and data over an analog channel. More particularly, an entire analog speech signal and a modulated data signal are capable of being transmitted over an analog channel by the multiplexing of the entire data signal within the portion of the normal analog speech signal frequency band where the speech signal is present and the power density characteristic thereof is low.

2. Description of the Prior Art

Existing analog transmission facilities would be more efficient if speech and data could be simultaneously transmitted over the same channel. Preferably, such proposal should not compromise the recovered speech and data qualities, neither should there be an expansion in the bandwith requirements. At the same time, it is desirable to have a system which is simple and cost-effective.

A method of transmitting data and speech signals in a telephone system in which communication is effected via a radio link is disclosed in U.S. Pat. No. 4,280,020 issued to L. E. Schnurr on July 21, 1981. There the data and speech signals are separated in the frequency domain and transmitted in respective separate sideband channels, the data sideband channel containing sidebands generated by time coding an otherwise continuous wave signal.

A spread spectrum arrangement for (de)multiplexing speech signals and nonspeech signals was disclosed in U.S. Pat. No. 4,313,197 issued to N. F. Maxemchuk on Jan. 26, 1982. There, at the transmitter, a block of speech signals may be converted from the time domain to a frequency domain by a Fourier transformation. A Fourier component may be pseudo-randomly selected from a subset of such components. Responsive to the selected components, a prediction of the component may be substituted therefor, the prediction being thereafter modified, e.g., by its amplitude being incremented or decremented to reflect the multiplexing of a logic 1 or a logic 0 nonspeech signal. The modified prediction may be converted back to the time domain for transmission to the receiver. At the receiver, a parallel demultiplexing occurs for extracting speech signals and nonspeech signals for the multiplexed signals.

Recently several systems have been proposed to send speech and data simultaneously which exploit the properties of the Short Time Fast Fourier Transform (FFT) and the statistical properties of speech. For example, in the article "Simultaneous Transmission of Speech and Data using Code-Breaking Techniques" by R. Steele et al in BSTJ, Vol. 60, No. 9, November 1981 at pages 2081–2105, a system whereby speech is used as a data carrier is proposed. More particularly, the speech, sampled at 8 kHz, is divided into blocks of N samples, and provided the correlation coefficient and mean square value of the samples exceed system thresholds, data is allowed to be transmitted. If the data is a logical 0, the samples are sent without modification; however, if a logical 1 is present, frequency inversion scrambling of the samples occurs. The receiver performs the inverse process to recover both the speech and data. These techniques can be quite complex and require careful timing and non-dispersive channels.

The problem remaining is to provide a technique for the simultaneous transmission of speech and data over a channel which is simple and cost effective and does not require an expansion in bandwidth requirements.

SUMMARY OF THE INVENTION

The foregoing problem has been solved in accordance with the present invention which relates to a technique for the simultaneous transmission of speech and data over an analog channel. More particularly, an entire analog speech signal and a modulated data signal are capable of being transmitted over a normal analog channel by the multiplexing of the data signal within the portion of the normal analog speech signal frequency band where the speech signal is present and the power density characteristic thereof is low.

It is an aspect of the present invention to provide a receiver for recovering from an analog transmission channel, which includes a predetermined channel bandwidth, each of a simultaneously received analog speech signal and a modulated data signal, where the analog speech signal includes a predetermined power density characteristic over the bandwidth of the analog transmission channel and the data signal is received in the portion of the analog transmission channel frequency band where the power density characteristic of the analog speech signal is at a minimal level. At the receiver the data is detected and is remodulated and then subtracted, via an adaptive filter, from the transmitted and received signal to yield the recovered speech. The weights used in the adaptive filter are adjusted by a device implementing the least mean square algorithm to enable maximum removal of the data signal from the received composite speech and data signal.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
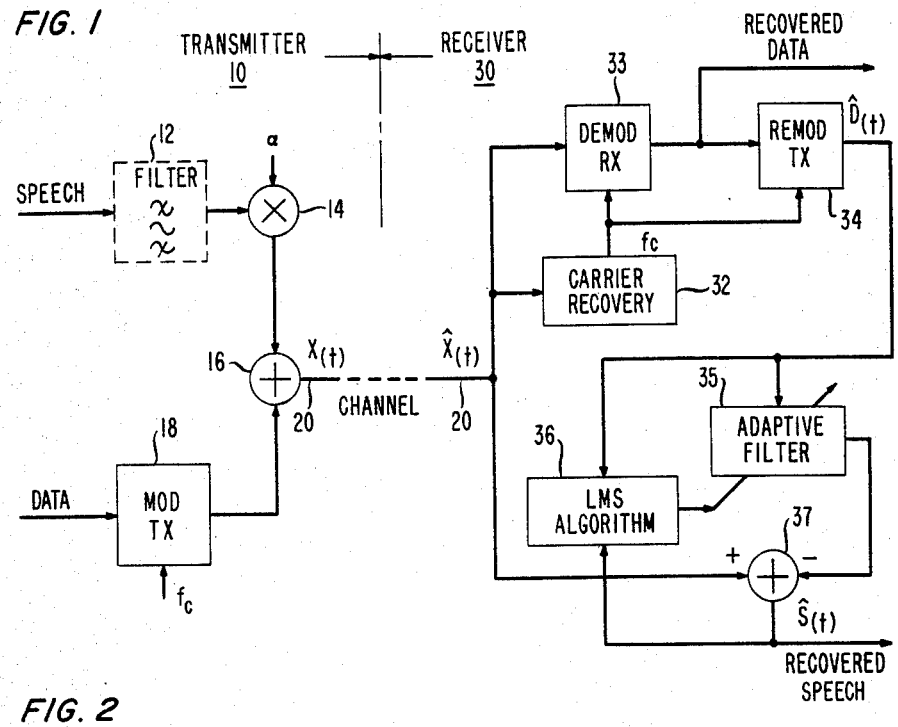
FIG. 1 is a block diagram of a preferred transmitter and receiver arrangement for transmitting simultaneous speech and MPSK modulated data signals.

A block diagram of a preferred arrangement of a system in accordance with the present invention which transmits analog speech and data signals simultaneously is shown in FIG. 1. The system comprises a transmitter 10 which receives a speech signal and a data signal as inputs from external sources not shown. The speech signal can be bandpass filtered in optional filter 12 to an exemplary frequency band of, for example, 200 Hz to 3200 Hz if desired. The resultant speech signals $S_{(t)}$ is then scaled by a factor $\alpha$ in multiplier 14 and transmitted to an adder 16. The input data signal is modulated in a modulator 18 with a predetermined carrier frequency $f_c$, which hereinafter will take the exemplary form of a Multilevel Phase Shift Keyed (MPSK) carrier within the analog speech signal frequency band of, for example, 2500 Hz to generate a MPSK modulated data signal $D_{(t)}$ which can include raised cosine pulse shaping. The resultant exemplary MPSK modulated data signal is added to the weighted speech signal in adder 16 to produce the transmitted signal $X_{(t)}$ over the analog transmission channel 20. The transmitted signal can be defined as $X_{(t)} = D_{(t)} + \alpha S_{(t)}$.

In the present system, the transmitted signal $X_{(t)}$ passes through an analog transmission channel 20. To a first approximation, this channel can be described by its impulse response, $H_{ch(t)}$. The receiver 30 sees the transmitted signal $\hat{X}_{(t)}$ as the convolution of the channel impulse response and the transmitted signal, i.e., $$\hat{X}_{(t)} = (D_{(t)} + \alpha S_{(t)} * H_{ch(t)}) = (D_{(t)} * H_{ch(t)}) + (\alpha S_{(t)} * H_{ch(t)}). \quad (1)$$

Receiver 30 recovers the data portion of the received signal $\hat{X}_{(t)}$ in a conventional manner using any suitable carrier recovery arrangement 32 and MPSK demodulator 33. The performance of the data signal recovery portion of receiver 30 depends largely upon the system parameter $\alpha$. From equation (1) it can be seen that the data signal $D_{(t)}$ must be detected in the presence of the speech signal $S_{(t)}$. The system parameter $\alpha$ is adjusted to make the speech power, $\sigma_s^2$, small enough for reliable data recovery.

The speech signal is recovered by subtracting the data signal $\hat{D}_{(t)}$ component from the appropriately synchronized composite signal $\hat{X}_{(t)}$. This is accomplished by first regenerating the data signal $\hat{D}_{(t)}$ in MPSK remodulator 34, which corresponds in function to MPSK modulator 18 at the transmitter 10. Timing for the MPSK remodulator 34 is obtained from the carrier recovery circuit 32. The data signal $\hat{D}_{(t)}$ is not subtracted directly from the received composite signal $\hat{X}_{(t)}$ to recover the speech signal $\hat{S}_{(t)}$ until the effects of channel 20 have been accounted for. To do this, an estimate of the channel response $H_{ch(t)}$ must be made after which the speech signal $\hat{S}_{(t)}$ is recovered via $$\hat{S}_{(t)} = [(D_{(t)} * H_{ch(t)}) + (\alpha S_{(t)} * H_{ch(t)})] - (\hat{D}_{(t)} * \hat{H}_{ch(t)}). \quad (2)$$

The problem of estimating the channel response $H_{ch(t)}$ knowing the data signal $D_{(t)}$ and not knowing the random variable speech signal $S_{(t)}$ is solved in accordance with the present invention by the use of an adaptive filter 35. Presently, an adaptive Finite Impulse Response (FIR) filter whose weights are adjusted by the least mean square (LMS) algorithm via device 36 is used for adaptive filter 35. A Typical arrangement is shown in FIG. 29 of the article "Adaptive Noise Cancelling: Principles and Applications" by B. Widrow et al in *Proceedings of the IEEE*, Vol. 63, No. 12, December 1975 at page 1709.

Figure 2:
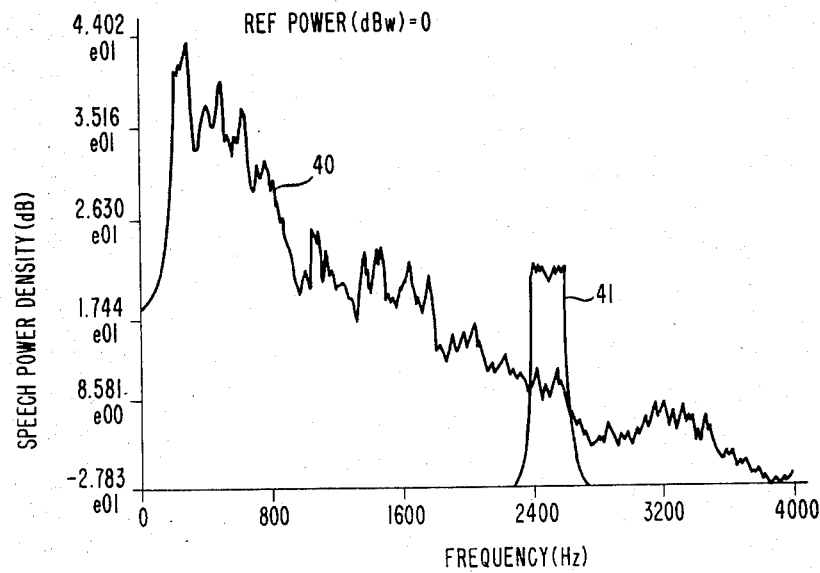
FIG. 2 is a plot of the power density (db) vs frequency averaged for exemplary speech spoken by male and female speakers and a predetermined baud rate data signal transmitted in accordance with the present invention.

The performance of a MPSK receiver, comprising Carrier Recovery circuit 32 and MPSK demodulator 33, with Gaussian interference is well understood. However, when the interference is speech, the receiver performance requires special attention. White Gaussian noise has a uniform frequency distribution, so when the data bit-error-rate (BER) is looked at, the MPSK carrier frequency is not important. The power density of speech is not uniform with frequency, but rather decreases rapidly as the frequency increases as shown in FIG. 2 for curve 40. In this case the MPSK carrier frequency is expected to play an important role in the BER performance since it is only that portion of the interference falling within the same bandwidth as the data signal which contributes to its detriment. A typical data signal with a Binary Phase Shift Keyed (BPSK) carrier frequency of 2500 Hz and baud rate of, for example, 250 is also shown in FIG. 2 as curve 41 superimposed on speech signal curve 40.

Figure 4:
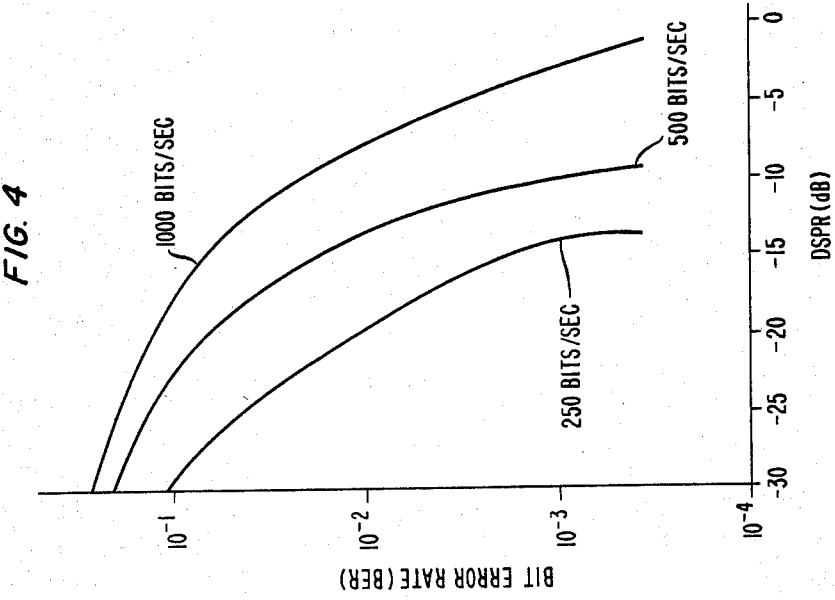
FIG. 4 are plots of exemplary BER vs DSPR curves for bit rates between 250 and 1000 bits/sec., where the BPSK data carrier frequency is 2500 Hz.
Figure 3:
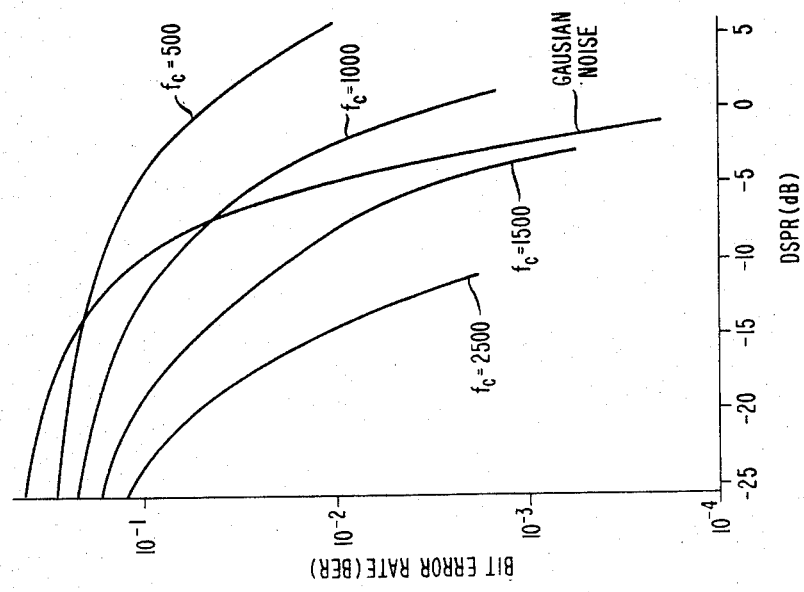
FIG. 3 illustrates exemplary curves of the Bit Error Rate (BER) vs data-to-speech power ratio (DSPR) for a data bit rate of 500 bits/sec. for BPSK data carrier frequencies ranging from 500 to 2500 Hz and for Gaussian noise.

It has been found that for a given data-to-speech power ratio (DSPR), better BER performance is obtained when a higher carrier frequency is selected as shown in FIG. 3 using a matched filter receiver. FIG. 4 shows the BER performance for different DSPRs when different data rates are used. In FIG. 4, the BPSK carrier frequency used is the exemplary 2.5 kHz and, as shown, the higher data rates require a higher DSPR for a given BER. As mentioned hereinbefore, the parameter $\alpha$ is adjusted to make the speech power small enough for reliable data recovery. The value of $\alpha$ can be easily determined from the DSPR as $$\alpha = 10^{(-\frac{DSPRdb}{20})}. \quad (3)$$

The degree to which the speech signal can be recovered from the composite data and speech signal received in receiver 30 is limited primarily by how well the channel 20 response $H_{ch(t)}$ can be estimated using equation (2). Adaptive FIR filter 35, configured for adaptive cancellation, is found to be very efficient in solving such problems where the regenerated data signal $\hat{D}_{(t)}$ from remodulator 34 is convolved with an arbitrary impulse response $\hat{H}_{(t)}$. The resultant signal is then subtracted in subtractor 37 from the composite signal $\hat{X}_{(t)}$ which is synchronized to $\hat{D}_{(t)}$ by any suitable means, such as a delay in the + input leg to subtractor 37 in FIG. 1, leaving the recovered speech $\hat{S}_{(t)}$. To improve the estimate of the recovered speech, a least mean square (LMS) algorithm is used via circuit 36 to update the impulse response $\hat{H}_{(t)}$, i.e., $$\hat{H}_{(t+1)} = \hat{H}_{(t)} + \mu \hat{S}_{(t)} D_{(t)}, \quad (4)$$

used by adaptive filter 35. After many iterations, $\hat{H}_{(t)}$ converges from its arbitrary response $\hat{H}_{(t)}$ to $H_{ch(t)}$, and the recovered speech at the output of subtractor 37 contains little or no noise attributed to the data signal $\hat{D}_{(t)}$.

The parameter $\mu$ controls how fast filter 35 converges. Larger value allows fast adaptation, but if $\mu$ is too large, instability occurs. In addition small values of $\mu$ yield smaller errors between the final $\hat{H}_{(t)}$ and $H_{ch(t)}$. The theory of the adaptive filter is described in the heretofore mentioned article by Widrow et al in the December 1975 issue of the *Proceedings of the IEEE*. As a typical example, a FIR filter length of 64 and a $\mu$ of $10^{-9}$ was used to achieve a data cancellation in the neighborhood of 33 db.

The heretofore described application of the adaptive filter 35 is a special case where the bandwidth of the input data signal $\hat{D}_{(t)}$ does not occupy the entire analog transmission channel bandwidth. In this case, there are many responses $\hat{H}_{(t)}$ which will work with adaptive filter 35. The response outside the bandwidth of the data signal $\hat{D}_{(t)}$ is not defined, so a family of solutions exist. After the LMS algorithm from circuit 36 has converged, $\hat{H}_{(t)}$ will continue to change until it arrives at one of the solutions which creates arithmetic errors in the particular hardware implementation. A simple solution to this problem is to remove the modulation filter found in the MPSK modulator 34 located at receiver 30. The resulting signal $\hat{D}_{(t)}$ would then be broadband. The adaptive filter solution would then be unique and consist of the channel response $H_{ch(t)}$ convolved with the RC filter response.

It is to be understood that the recovered speech is impaired by channel dispersion, additive channel noise, and imperfect cancellation of the data signal. To quantify the recovered speech quality, the speech signal-to-noise ratio (SNR) is used. The SNR can be evaluated as $$SNR = 10 \log \frac{\sigma_S^2 \alpha^2}{N_{ch} + N_D} . \tag{5}$$

$N_{ch}$ is the additive channel noise power while $N_D$ is the noise power created by the canceled data signal $\hat{D}_{(t)}$ and $\sigma_S^2$ is the power of the speech signal. Hereinbefore, it was stated that a smaller value of $\alpha$ yields a better BER. However, from Equation (5) it can be seen that the recovered speech SNR decreases with $\alpha$ and that, if $\alpha$ must be very small, poor recovered speech quality is expected. Therefore, $\alpha$ is an important system parameter in deciding the best compromise between recovered data and speech performance.

It is to be understood that the above-described embodiments are simply illustrative of the principles of the invention. Various other modifications and changes may be made by those skilled in the art which will embody the principles of the invention and fall within the spirit and scope thereof. It is to be understood that analog transmission channel 20 can comprise many forms such as, for example, a common telephone channel which operates within the 0-4000 Hz range with unknown amplitude and frequency distortions.

What is claimed is:

1. A receiver comprising:
    an input terminal capable of simultaneously receiving an analog speech signal which includes a predetermined power density characteristic over a predetermined bandwidth and a data signal which is received in a portion of the received analog speech signal bandwidth where the analog speech signal is present and the power density characteristic of the analog speech signal is at a low value;
    a first and a second output terminal;
    means responsive to a received composite analog speech and modulated data signal at the input terminal for demodulating and recovering the data signal therefrom at an output thereof for transmission to the receiver first output terminal;
    means capable of remodulating the recovered data signal at the output of the demodulating and recovering means for generating an output signal corresponding substantially to the data signal received at the input terminal of the receiver;
    adaptive filtering means capable of generating a first signal representative of an estimate of an impulse response of a channel connected to the input terminal of the receiver, and convolving said first signal with the remodulated data output signal from the remodulating means to generate a resultant output data signal; and
    means capable of subtracting the resultant output data signal generated by the adaptive filtering means from the composite analog speech and data signal received at the input terminal of the receiver for substantially canceling the data signal forming part of the composite received signal and generating a resultant output signal at the second output terminal of the receiver which comprises the recovered analog speech signal.

2. A receiver in accordance with claim 1 wherein the adaptive filtering means comprises:
    means capable of generating said first signal and convolving said first signal with the remodulated data output signal from the remodulating means; and
    means responsive to the resultant output signal from the subtracting means and the remodulated data output signal from the remodulating means for causing a modification of the first signal generated by the generating and convolving means for producing a resultant output data signal of the adaptive filtering means which best cancels the data signal at the second output terminal of the receiver.

3. A receiver in accordance with claim 2 wherein the modification means of the adaptive filtering means comprises an arrangement for implementing a least means square algorithm on sequential sychronized samples of the output signals of both the remodulating and the subtracting means for producing control signals to the generating and convolving means which converge the estimate of an impulse response of the channel connected to the input terminal of the receiver to an actual channel impulse response.

4. A receiver in accordance with claim 1 wherein the adaptive filtering means generates a first signal which is an estimate of an impulse response of an analog transmission channel.

5. A receiver in accordance with claim 1 wherein the received binary data signal at the input terminal is a multilevel phase-shift-keyed data signal.

* * * * *